US011054042B2

(12) United States Patent
Nasu et al.

(10) Patent No.: US 11,054,042 B2
(45) Date of Patent: Jul. 6, 2021

(54) ECCENTRIC BUTTERFLY VALVE

(71) Applicant: ASAHI YUKIZAI CORPORATION, Nobeoka (JP)

(72) Inventors: Takashi Nasu, Nobeoka (JP); Shinobu Kamimura, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 0 days.

(21) Appl. No.: 16/960,604

(22) PCT Filed: Jan. 8, 2019

(86) PCT No.: PCT/JP2019/000231
§ 371 (c)(1),
(2) Date: Jul. 8, 2020

(87) PCT Pub. No.: WO2019/139005
PCT Pub. Date: Jul. 18, 2019

(65) Prior Publication Data
US 2021/0003222 A1  Jan. 7, 2021

(30) Foreign Application Priority Data

Jan. 10, 2018  (JP) .............................. JP2018-001830

(51) Int. Cl.
*F16K 1/226* (2006.01)
*F16K 1/22* (2006.01)

(52) U.S. Cl.
CPC ............ *F16K 1/2261* (2013.01); *F16K 1/222* (2013.01); *F16K 1/226* (2013.01); *F16K 1/2268* (2013.01)

(58) Field of Classification Search
CPC .......... F16K 1/2261; F16K 1/22; F16K 1/226; F16K 1/222; F16K 1/2263; F16K 1/2268
(Continued)

(56) References Cited

U.S. PATENT DOCUMENTS 2,882,010 A * 4/1959 Bryant .................... F16K 1/226
                                                        251/306
3,260,496 A * 7/1966 Borcherdt ............. F16K 1/2263
                                                        251/171
(Continued)

FOREIGN PATENT DOCUMENTS

JP      S51-124828 A   10/1976
JP      S54-17528 A     2/1979
(Continued)

OTHER PUBLICATIONS

PCT/ISA/210, "International Search Report for International Application No. PCT/JP2019/000231," dated Mar. 26, 2019.

*Primary Examiner* — John Bastianelli
(74) *Attorney, Agent, or Firm* — Manabu Kanesaka

(57) ABSTRACT

An eccentric butterfly valve includes a valve body formed therein with an internal flow passage extending in a direction of the flow passage axis, a valve member supported by the valve body through valve stems to be rotatable about a rotation axis perpendicular to the flow passage axis, and a seat ring attached to an inner periphery of the internal flow passage. The valve stems include a first valve stem and a second valve stem. The valve body is formed therein with a stem through-hole through which the first valve stem is inserted and a stem bottomed-hole supporting the second valve stem. The valve member is provided with a fitting hole and an engagement groove. A fitting portion provided at the first valve stem is fitted into the fitting hole and an engagement portion provided at the second valve stem is inserted into the engagement groove.

8 Claims, 8 Drawing Sheets

(58) Field of Classification Search
USPC .................................................. 251/305–308
See application file for complete search history.

(56) References Cited

U.S. PATENT DOCUMENTS

| | | | | |
|---|---|---|---|---|
| 3,290,001 | A | * | 12/1966 | Taylor ...................... F16K 1/226 |
| | | | | 251/175 |
| 3,384,340 | A | * | 5/1968 | Fawkes ...................... F16K 1/22 |
| | | | | 251/307 |
| 3,531,075 | A | * | 9/1970 | Kazuo ........................ F16K 1/22 |
| | | | | 251/306 |
| 3,601,360 | A | | 8/1971 | Scaramucci |
| 3,650,508 | A | * | 3/1972 | Kosmala ............... F16K 1/2263 |
| | | | | 251/174 |
| 3,997,142 | A | | 12/1976 | Broadway |
| 4,176,820 | A | | 12/1979 | Broadway |
| 4,420,140 | A | * | 12/1983 | Gachot ...................... F16K 1/22 |
| | | | | 251/152 |
| 4,659,064 | A | * | 4/1987 | Scobie .................. F16K 1/2268 |
| | | | | 251/214 |
| 4,682,758 | A | * | 7/1987 | Scobie ...................... F16K 1/22 |
| | | | | 251/308 |
| 2015/0076384 | A1 | | 3/2015 | Lurk et al. |

FOREIGN PATENT DOCUMENTS

| | | |
|---|---|---|
| JP | S60-188272 U | 12/1985 |
| JP | H07-113472 A | 5/1995 |

\* cited by examiner

ECCENTRIC BUTTERFLY VALVE

RELATED APPLICATIONS

The present application is National Phase of International Application No. PCT/JP2019/000231 filed Jan. 8, 2019, and claims priority from Japanese Application No. 2018-001830, filed Jan. 10, 2018, the disclosure of which is hereby incorporated by reference herein in its entirety.

TECHNICAL FIELD

The present invention relates to an eccentric butterfly valve, which is used for fluid transport piping lines in various industries, opening and closing a flow passage by rotating a valve member.

BACKGROUND ART

In various industries, such as a chemical factory, a semiconductor manufacturing field, a food field, and a biotechnology field, a butterfly valve is used for opening and closing or controlling a flow passage through which various kinds of fluid flow. In the butterfly valve, a disk-shaped valve member rotatably supported by a valve body with a valve stem is disposed in a tubular flow passage formed in the valve body. The valve stem is rotated by a handle or an actuator connected to the valve stem and an outer peripheral edge portion of the valve member is brought into and out of contact with an annular sheet member provided between the inner peripheral surface of the flow passage or the valve body and the outer peripheral edge portion of the valve member, thus opening and closing the flow passage.

The butterfly valve has a configuration as described above, and therefore, even when the valve is fully opened, the valve member is arranged at the center of the flow passage of the valve body such that the principal surface (the surface which is directed in the direction of the flow passage axis when the valve is closed) is substantially parallel to the flow passage direction. As a result, the valve member reduces the flow passage area and serves as a resistance against a fluid to thereby reduce the valve flow coefficient, such as a Cv value. Particularly, in an eccentric butterfly valve which has a stem connected to the valve member such that the rotation axis is offset in the thickness direction of the valve member from the center axis of the valve member, the valve member is increased in thickness due to the configuration. Therefore, the valve member greatly affects the reduction in the flow passage area or an increase in a fluid resistance. There are proposed, as one of measures against such problems, butterfly valves configured so that a groove portion linearly extending perpendicularly to the rotation axis is provided in the main surface of the valve member to form the cross section of the valve member into a substantially C shape, thereby increasing the flow passage area in full open and reducing the flow passage resistance, as described, for example, in PTL1 and PTL2.

CITATION LIST

Patent Literature

PTL1: Japanese Unexamined Patent Publication No. H7-113472
PTL2: Japanese Unexamined Utility Model Publication No. S60-188272

SUMMARY OF THE INVENTION

Technical Problem

As described above, the reduction in the thickness of a part of the valve member by forming the groove portion in the valve member is advantageous to the increase in the flow passage area or the reduction in the flow passage resistance. However, when the valve member having the valve stem extending therethrough is supported in the valve body, the valve stem is exposed to serve as a resistance against a fluid. When the valve stem is prevented from being exposed, the groove portion cannot be made deep, and thus an opening area cannot be sufficiently increased. Hence, the effect of increasing the valve flow coefficient is reduced. For this reason, a structure of rotatably supporting the valve member in the valve body with two valve stems as in the butterfly valve described in PTL1 or PTL2 has been adopted.

In the above-described structure, considering the assembly, a system has been adopted in which fitting holes are provided in an upper portion and a lower portion of the valve member and stem through-holes are provided in an upper portion and a lower portion of the valve body, and then the valve stems are fitted into and fixed to the fitting holes of the valve member through the upper and lower stem through-holes to support the valve member in the valve body and, in order to prevent the leakage of a fluid in the flow passage to the outside, annular rubber sealing members are disposed between the outer peripheral surfaces of the valve stems and the inner peripheral surfaces of the stem through-holes. However, according to such a system, while the structure is simple and the manufacturing can be achieved at a low cost, there sometimes occurs a case where the fluid in the flow passage leaks to the outside through sealing portions of the upper and lower stem through-holes, and thus it has not been able to be said that the sealing performance is sufficient.

Accordingly, it is an object of the present invention to solve the problems existing in the prior art and provide an eccentric butterfly valve which makes it possible to suppress the leakage of a fluid in a flow passage to the outside while realizing an improvement of a valve flow coefficient.

Solution to Problem

In view of the above-described object, the present invention provides an eccentric butterfly valve including a valve body formed therein with an internal flow passage extending in a direction of a flow passage axis, a disk-shaped valve member disposed in the internal flow passage and supported by the valve body through valve stems to be rotatable about a rotation axis perpendicular to the flow passage axis, and a seat ring attached to an inner periphery of the internal flow passage, the seat ring defining a sealing plane sealing the internal flow passage between the seat ring and an outer peripheral edge portion of the valve member in valve closing, the rotation axis being located eccentrically in the direction of the flow passage axis from the sealing surface, in which the valve stems includes a first valve stem and a second valve stem; the valve body is formed therein with a stem through-hole extending through the valve body from an outer peripheral surface of the valve body to the internal flow passage, the first valve stem being rotatably inserted through the stem through-hole, the stem bottomed-hole rotatably supporting the second valve stem; the valve member is provided at positions thereof opposite to each other in the direction of the rotation axis with a fitting hole and an engagement groove, respectively; and the first valve stem extending through the stem through-hole is provided at a tip portion thereof with a fitting portion, the fitting portion being fitted into the fitting hole, so that the first valve stem is unrotatably coupled to the valve member, and the second valve stem is provided, at a tip portion thereof projecting from the stem bottomed-hole, with an engagement portion, said engagement portion being inserted into the engagement groove in a direction perpendicular to the rotation axis, so that the second valve stem is unrotatably coupled to the valve member.

In the above-described eccentric butterfly valve, the valve member is rotatably supported by the valve body with the two valve stems, and the valve stems do not extend through the valve member. Therefore, a deep groove portion can be formed in a center portion of the valve member, and thus the opening area in full open can be increased, so that the valve flow coefficient can be improved. Moreover, by inserting the valve member into the internal flow passage in the direction perpendicular to the rotation axis, the engagement portion of the second valve stem projecting from the stem hole in a state where the second valve stem is inserted into the stem bottomed-hole is inserted into the engagement groove of the valve member, so that the second valve stem and the valve member can be unrotatably coupled to each other. Furthermore, the first valve stem is then passed through the stem through-hole, so that the fitting portion of the first valve stem is fitted in the fitting hole of the valve member, and thus the first valve stem and the valve body can be unrotatably coupled to each other. Such a structure makes it possible to assemble the valve member and the valve body such that the valve member is rotatably supported in the internal flow passage of the valve body without forming one of the stem holes for the valve stems to be rotatably supported by the valve body as the stem through-hole. Therefore, there is no necessity of forming one of the stem holes formed in the valve body as the stem through-hole. As a result, a portion where a fluid in the flow passage may leak to the outside can be eliminated, and thus the leakage of the fluid in the flow passage to the outside through the stem hole can be suppressed.

In one embodiment of the eccentric butterfly valve, the engagement portion is a rail-like portion connected to a stem portion of the second valve stem located in the stem bottomed-hole and extending in the direction perpendicular to the rotation axis, and the engagement groove has a shape complementary to the engagement portion. In this case, it is preferable that the rail-like portion has a wedge-shaped cross section expanding toward a tip from a portion connecting to the stem portion.

Preferably, the rotation axis is further located eccentrically from a center of the internal flow passage.

It is preferable that an annular sealing member sealing a space between the inner peripheral surface of the stem through-hole and an outer peripheral surface of the first valve stem is disposed adjacent to an opening portion of the stem through-hole into the internal flow passage. It is more preferable that the first valve stem is provided at an end portion on an outer side thereof with a flange portion, the stem through-hole has an annular recessed portion formed in an outer peripheral side end portion thereof, and there is an annular plane sealing member held between the annular recessed portion and the flange portion.

Advantageous Effect of the Invention

According to the eccentric butterfly valve of the present invention, the opening area in full open can be increased by providing the groove portion in the valve member, thereby improve the valve flow coefficient. Moreover, the assembly of the valve member and the valve body can be achieved by forming only one of the valve stem holes provided in the valve body as the stem through-hole, and therefore a portion where a fluid in the flow passage may leak to the outside can be eliminated, and thus the leakage of the fluid in the flow passage to the outside through the stem hole can be suppressed.

DESCRIPTION OF EMBODIMENTS

Figure 1:
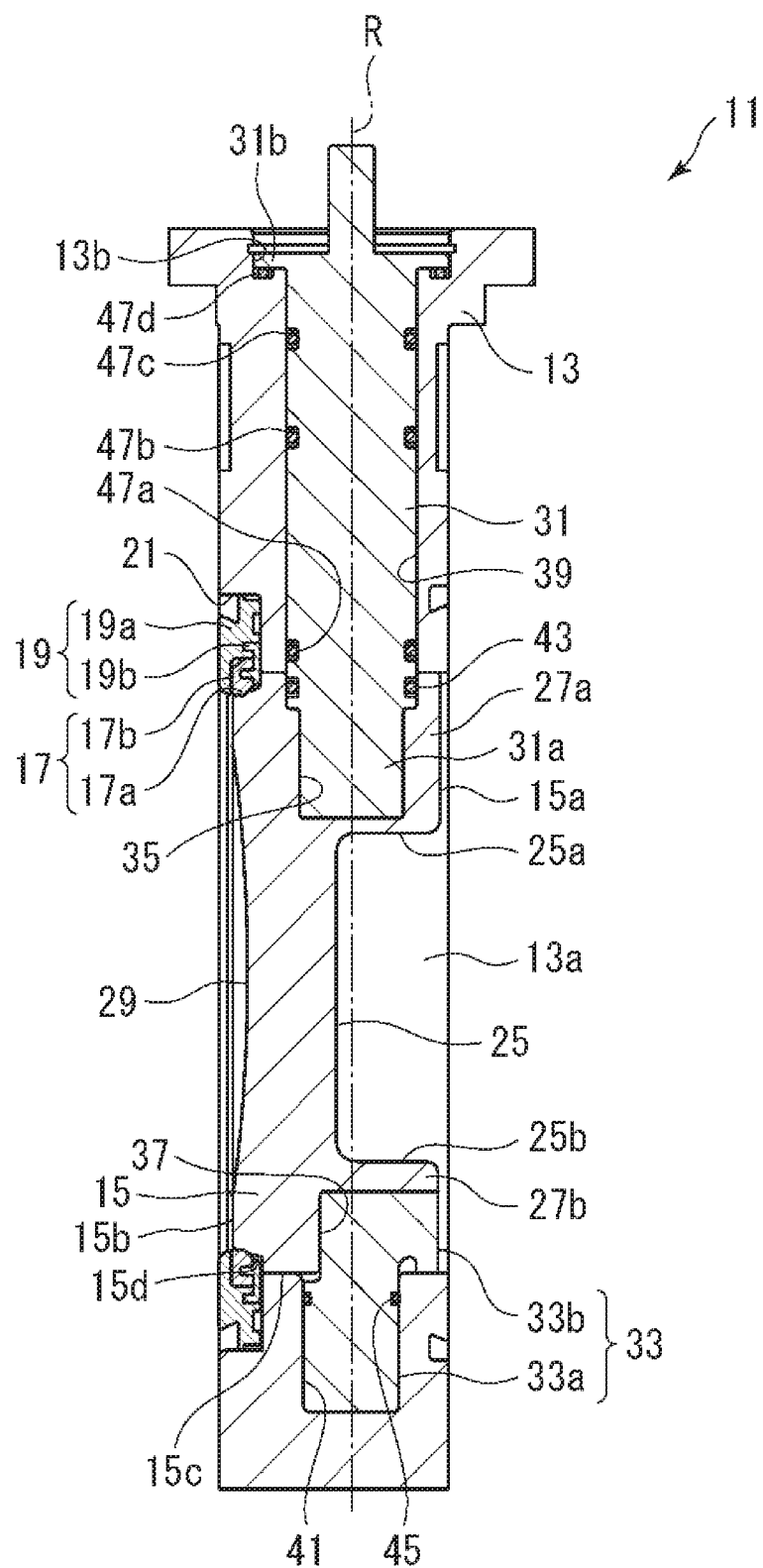
FIG. 1 is a longitudinal cross-sectional view showing the overall configuration of a butterfly valve according to the present invention.

An embodiment of a butterfly valve 11 according to the present invention will be described below with reference to the drawings.

First, an overall configuration of the butterfly valve 11 according to the present invention will be described with reference to FIG. 1 and FIG. 2.

The butterfly valve 11 includes a hollow cylindrical valve body 13 formed therein with an internal flow passage 13a extending in a direction of a flow passage axis, a substantially disk-shaped valve member 15 disposed in the internal flow passage 13a and rotatably supported by the valve body 13, an annular seat ring 17 attached to the inner periphery of the internal flow passage 13a, and an annular seat retainer 19 for fixing the seat ring 17 to the valve body 13 and is configured so that the internal flow passage 13a can be opened and closed by bringing an outer peripheral edge portion of the valve member 15 and a valve seat portion 17a formed on the seat ring 17 into and out of contact with each other.

Figure 7:
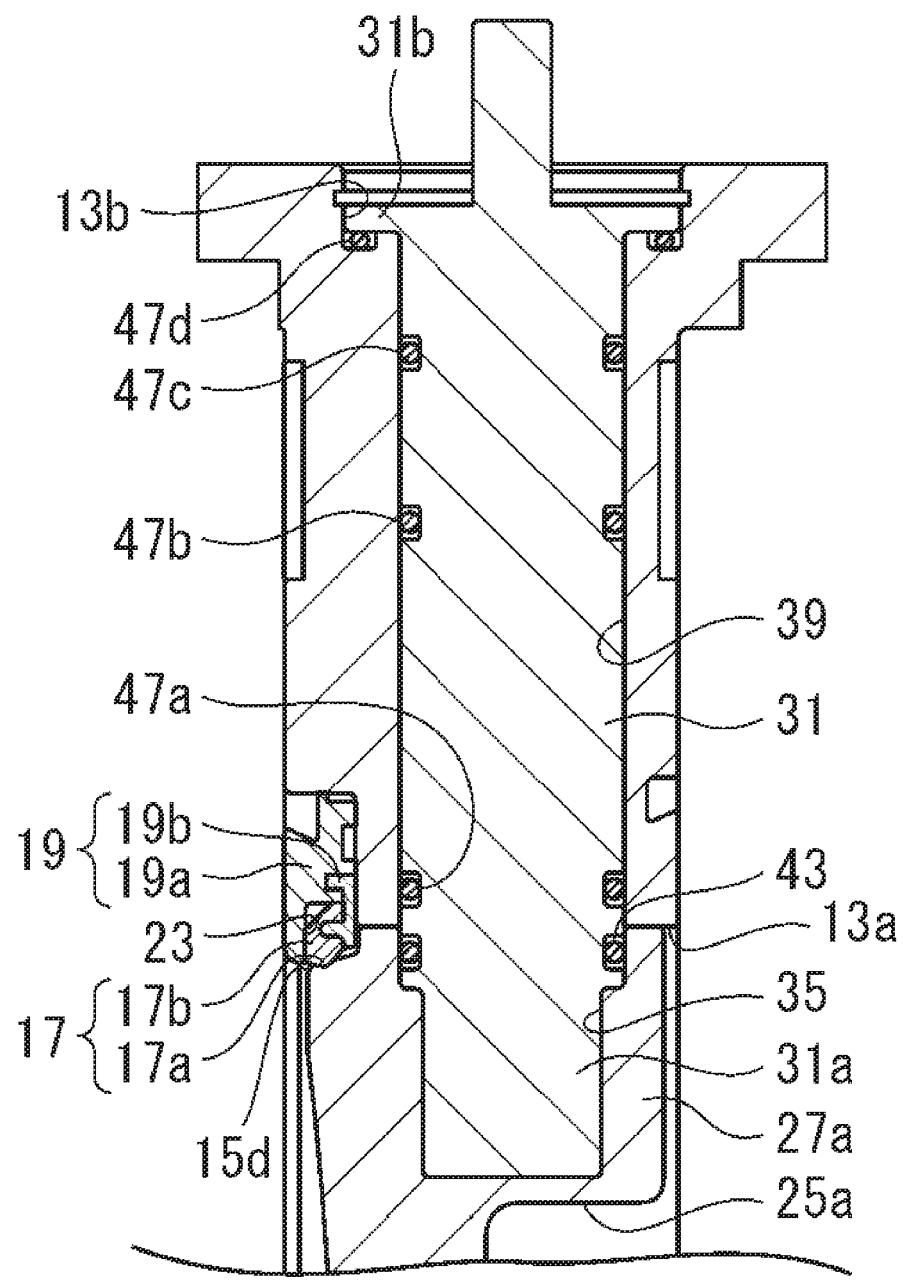
FIG. 7 is a partial longitudinal sectional view of the butterfly valve, showing a first valve stem on the upper side rotatably supporting the valve member of the butterfly valve shown in FIG. 1.

The valve body 13 is provided, in a peripheral edge portion of a downstream end portion of the internal flow passage 13a thereof in the direction of the flow passage axis, i.e., an outer surrounding portion of the internal flow passage 13a in the side surface of the valve body 13 on the downstream side in the direction of the flow passage axis, with an annular recessed portion 21 formed to extend in the radial direction to have substantially the same diameter as that of the outer diameter of the annular seat retainer 19. The seat ring 17 and the seat retainer 19 are fitted into the annular recessed portion 21. The seat retainer 19 includes an annular retainer body 19a and an annular retainer cap 19b. The retainer body 19a is formed to have a step portion 23 (see FIG. 7). The step portion 23 is configured to receive therein a retainer cap 19b and a fixing portion 17b of the seat ring 17 such that the fixing portion 17b of the seat ring 17 is arranged between the retainer cap 19b and the retainer body 19a. Such a configuration makes it possible to fix the retainer body 19a to the annular recessed portion 21 by an appropriate method and hold the fixing portion 17b of the seat ring 17 between the retainer body 19a and the retainer cap 19b arranged on the side surface of the annular recessed portion 21 in the direction of the flow passage axis, so that the seat ring 17 can be fixed to the annular recessed portion 21.

The retainer cap 19b is preferably arranged such that the inner peripheral edge end thereof projects into the internal flow passage 13a.

As a method of fixing the retainer body 19a to the annular recessed portion 21, a bayonet method disclosed in Japanese Unexamined Patent Publication No. H11-230372 can be adopted, for example. In this case, the retainer body 19a is provided, in the outer peripheral surface thereof on the side of the valve body 13, with a plurality of circular arc-shaped projection portions projecting in the radial direction and formed at equal intervals in the circumferential direction, and the annular recessed portion 21 is provided in an outer peripheral portion thereof with circular arc-shaped notch portions formed to be able to receive the circular arc-shaped projection portions and engagement grooves extending from the side of the side surface of the circular arc-shaped notch portions in the direction of the flow passage axis so as to guide the circular arc-shaped projection portions in the circumferential direction. Such a configuration makes it possible fix the retainer body 19a to the annular recessed portion 21, by turning the retainer body 19a in the circumferential direction, in a state where the circular arc-shaped projection portions of the retainer body 19a are fitted into the circular arc-shaped notch portions of the annular recessed portion 21 and then abut on the side surface of the annular recessed portion 21 in the direction of the flow passage axis, and then guiding the circular arc-shaped projection portions along the engagement grooves to engage the circular arc-shaped projection portions with the engagement grooves.

The seat ring 17 is formed of an elastic material and has the valve seat portion 17a and the fixing portion 17b. The valve seat portion 17a is formed to project into the internal flow passage 13a when the seat ring 17 is attached to the annular recessed portion 21 in the state where the fixing portion 17b is held between the retainer body 19a and the retainer cap 19b. Examples of suitable elastic materials forming the seat ring 17 include rubber elastic bodies, such as butyl rubber (BR), chloroprene rubber (CR), ethylene propylene diene rubber (EPDM), and fluororubber (FRM), fluororesin, such as polytetrafluoroethylene (PTFE), and rubber elastic bodies coated with fluororesin, such as PTFE.

Figure 2:
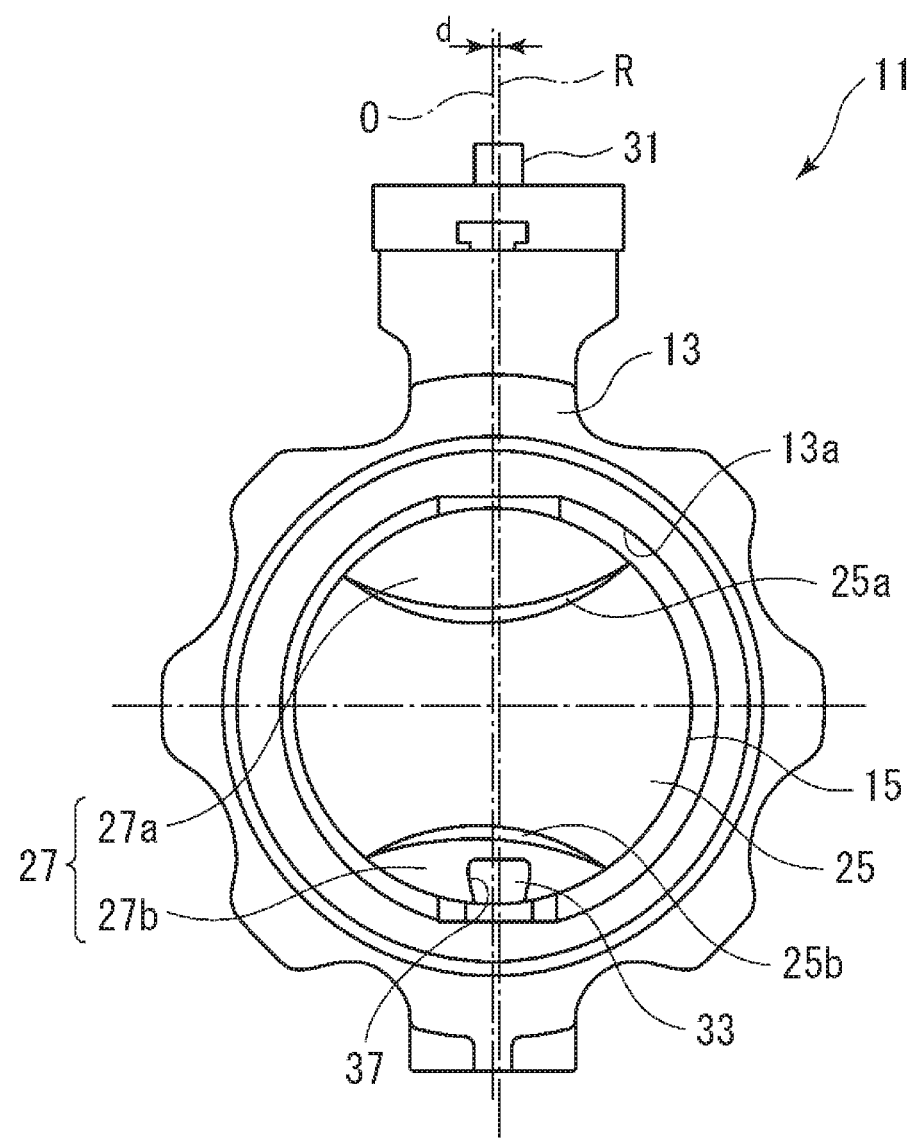
FIG. 2 is a side view of the butterfly valve shown in FIG. 1 as viewed from the right side.
Figure 3:
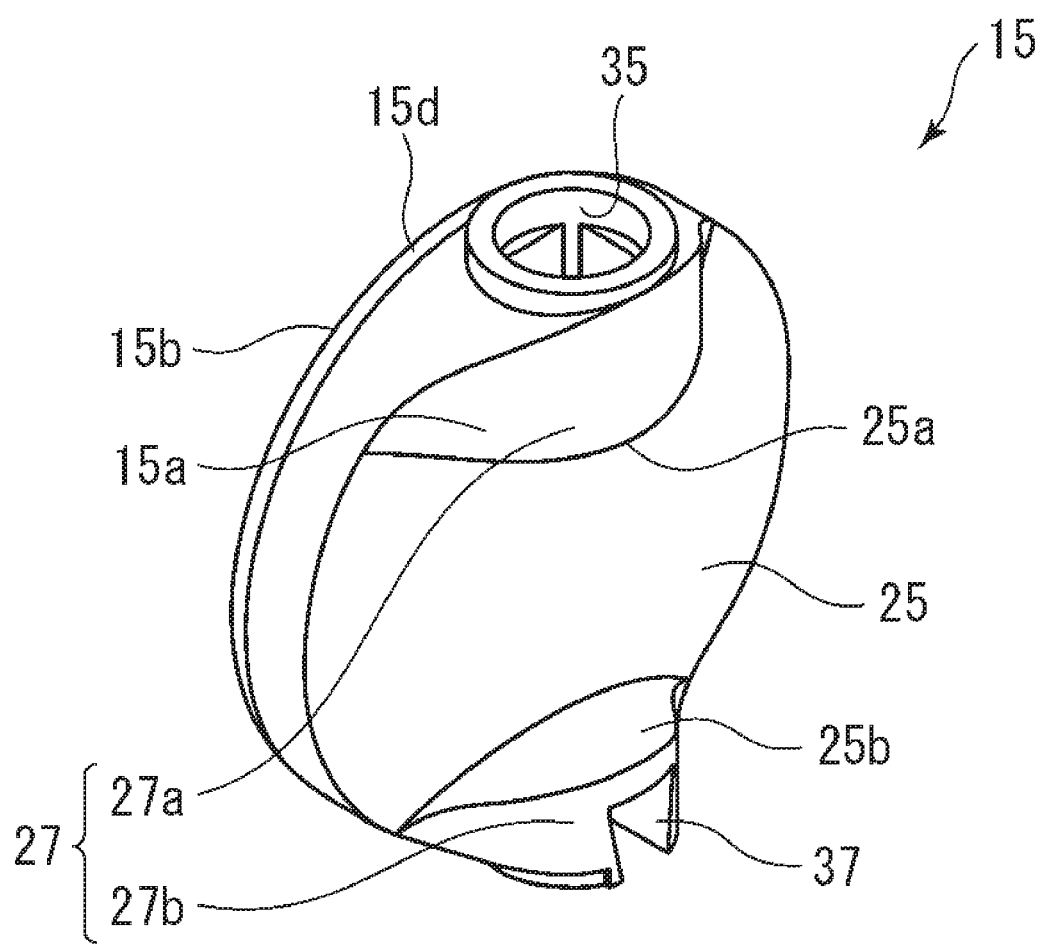
FIG. 3 is a perspective view of a valve member of the butterfly valve shown in FIG. 1.
Figure 4A:
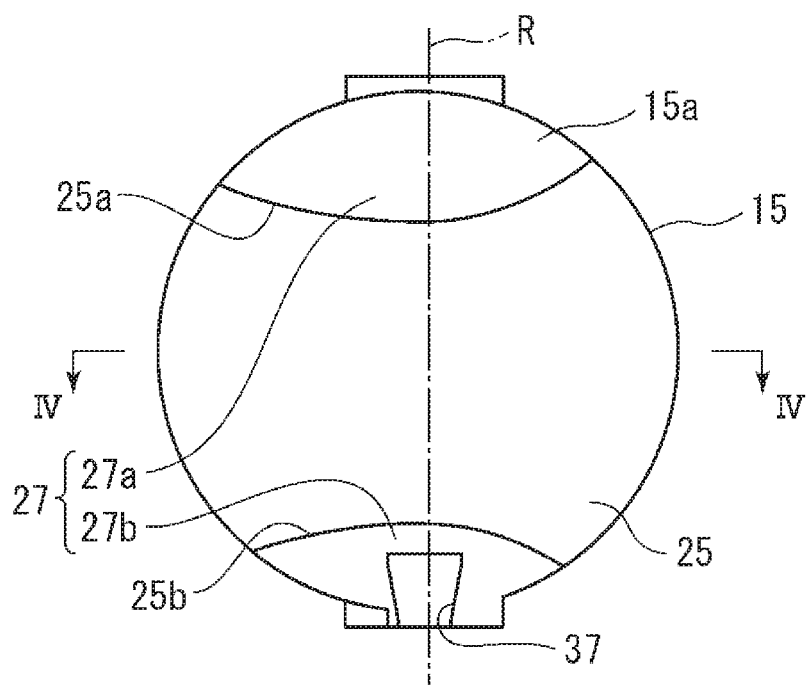
FIG. 4A is a plan view of the valve member shown in FIG. 3 as viewed from the right side in FIG. 1.
Figure 4B:
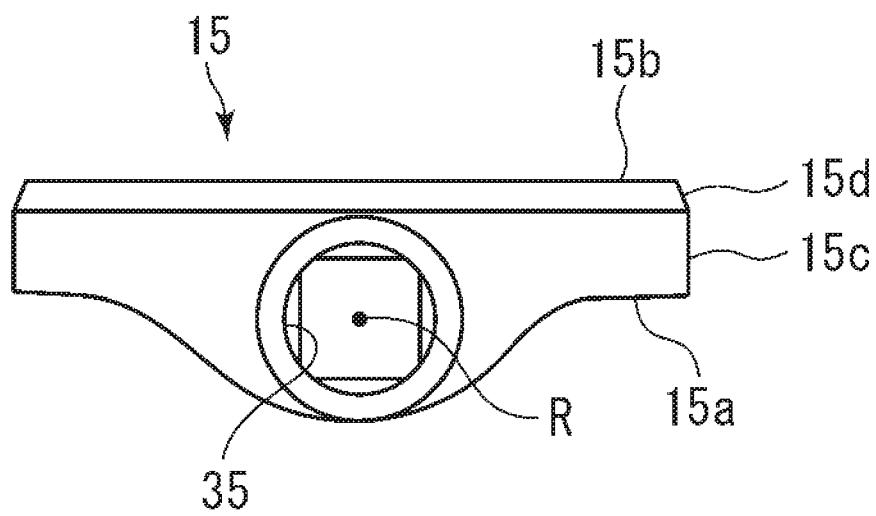
FIG. 4B is a top view of the valve member shown in FIG. 4A as viewed from above in FIG. 4A.
Figure 4C:
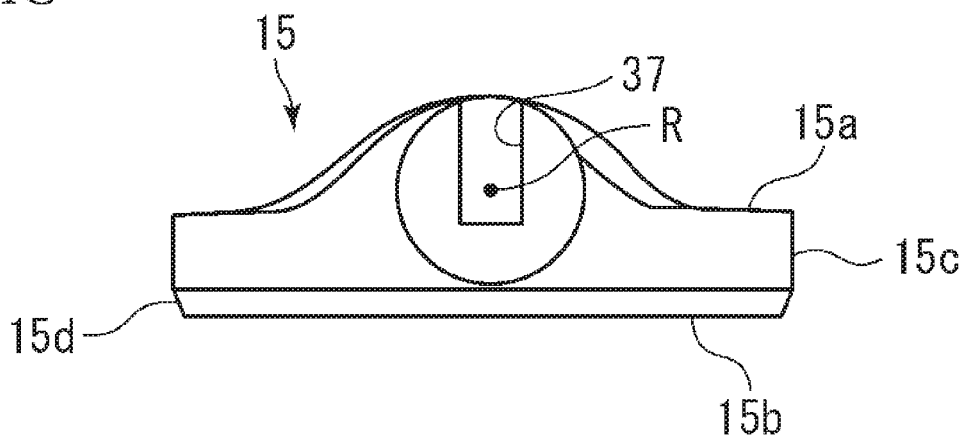
FIG. 4C is a bottom view of the valve member shown in FIG. 4A as viewed from below in FIG. 4A.

The valve member 15 has two principal surfaces 15a, 15b opposite to each other and an outer peripheral edge portion 15c annularly extending so as to connect the two principal surfaces 15a, 15b. The valve member 15 is provided in one principal surface 15a thereof with a groove portion 25 extending therethrough in a direction across (preferably a direction orthogonal to) a rotation axis R, as well shown in FIG. 3. Both side walls 25a, 25b of the groove portion 25 are formed to be convex curved surfaces extending in a convex shape toward the rotation axis R and toward each other as shown in FIG. 2 and FIG. 4A. Due to the formation of the groove portion 25 in the one principal surface 15a of the valve member 15, there are formed outer edge remaining portions 27 (27a, 27b) on both sides in the direction of the rotation axis R across the groove portion 25. The outer edge remaining portions 27 preferably have convex curved surfaces extending in a convex shape in a direction away from the rotation axis R as shown in FIG. 4B and FIG. 4C.

By providing the above-described groove portion 25, when the valve member 15 is rotated to a full open state, the opening area in the internal flow passage 13a is increased by the area of the groove portion 25, so that valve flow coefficient Cv increases. Moreover, the present inventors have found that generation of vortex is suppressed to reduce a pressure loss, by forming both the side walls 25a, 25b of the groove portion 25 as convex curved surfaces mutually extending in the convex shape toward the rotation axis R to be like throttle portions or by forming the outer edge remaining portions 27a, 27b formed on both sides of the groove portion 25 to have the convex curved surfaces extending in the convex shape in the direction away from the rotation axis R. This makes it possible to obtain an effect of improving valve flow coefficient Cv.

Figure 5:
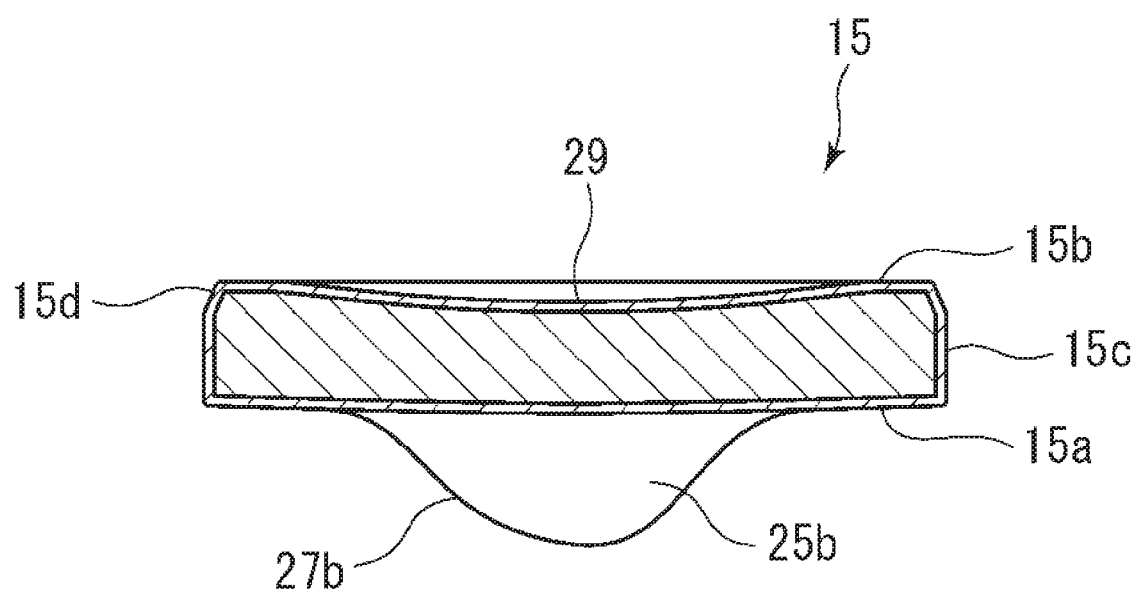
FIG. 5 is a cross-sectional view taken along line IV-IV of FIG. 4A as viewed from above in an arrow direction.

The valve member 15 has a spherical dent portion (hereinafter also referred to as "dimple") 29 formed in a center portion of the other principal surface 15b, as shown in FIG. 5. By providing the spherical dent portion 29, similarly, the generation of vortex is suppressed, so that the effect of improving valve flow coefficient can be obtained due to reduction of pressure loss.

The valve member 15 has a valve member valve seat surface 15d formed in the outer peripheral edge portion 15c thereof. By rotating the valve member 15 about the rotation axis R to press the valve member valve seat surface 15d against the valve seat portion 17a of the seat ring 17, a sealing plane sealing a space between the valve member valve seat surface 15d and the valve seat 17a is defined to close the internal flow passage 13a, thereby resulting in a closed valve state. The valve member valve seat surface 15d preferably has a shape like a part of a spherical surface.

In the butterfly valve 11 of the embodiment shown in the figures, the valve member 15 is rotatably supported by the valve body 13 with a first valve stem 31 and a second valve stem 33 and is provided at positions thereof opposite to each other in the direction of the rotation axis R with a fitting hole 35 for coupling with the first valve stem 31 and an engagement groove 37 for coupling with the second valve stem 33.

The first valve stem 31 is rotatably inserted through and supported in a first stem hole 39 formed in the valve body 13 to extend along the rotation axis R. The second valve stem 33 is inserted into and rotatably supported in a second stem hole 41 formed opposite to the first stem hole 39 across the internal flow passage 13a along the rotation axis R.

In the case where the valve member 15 is supported by the valve body 13 with one valve stem, the valve stem has to extend through the valve member 15. Therefore, if the deep groove portion 25 is provided in order to achieve a large opening area, the valve stem tends to be exposed to the outside, so that the valve stem occupies the internal flow passage particularly in an eccentric butterfly valve. As a result, the effect of increasing the opening area due to the groove portion 25 cannot be obtained. In contrast thereto, in the butterfly valve 11, the valve member 15 is rotatably supported by the valve body 13 with the two valve stems of the first valve stem 31 and the second valve stem 33. Therefore, even when the deep groove portion 25 is provided, the first valve stem 31 and the second valve stem 33 can be prevented from being exposed to the internal flow passage 13a. As a result, the effect of increasing the opening area due to the groove portion 25 can be easily obtained.

The first stem hole 39 is a stem through-hole extending through the valve body 13 from the outside to the internal flow passage 13a in the direction of the rotation axis R. The first valve stem 31 is rotatably inserted through the first stem hole 39 so that both end portions thereof project from the first stem hole 39. One end portion (upper end portion in FIG. 1) of the first valve stem 31 projecting to the outside is configured to allow a handle or a driving unit, not shown, to be attached thereto for operating or driving the valve member 15. The other end portion (lower end portion in FIG. 1) of the first valve stem 31 projecting into the internal flow passage 13a is formed to have a fitting portion 31a of a shape complementary to the fitting hole 35, so that the fitting hole 35 of the valve member 15 and the fitting portion 31a are fitted into each other to be unrotatable about the rotation axis R. For example, by forming the fitting hole 35 of the valve member 15 and the fitting portion 31a of the first valve stem 31 to have polygonal shapes, the fitting hole 35 and the fitting portion 31a can be unrotatably coupled to each other.

Figure 6A:
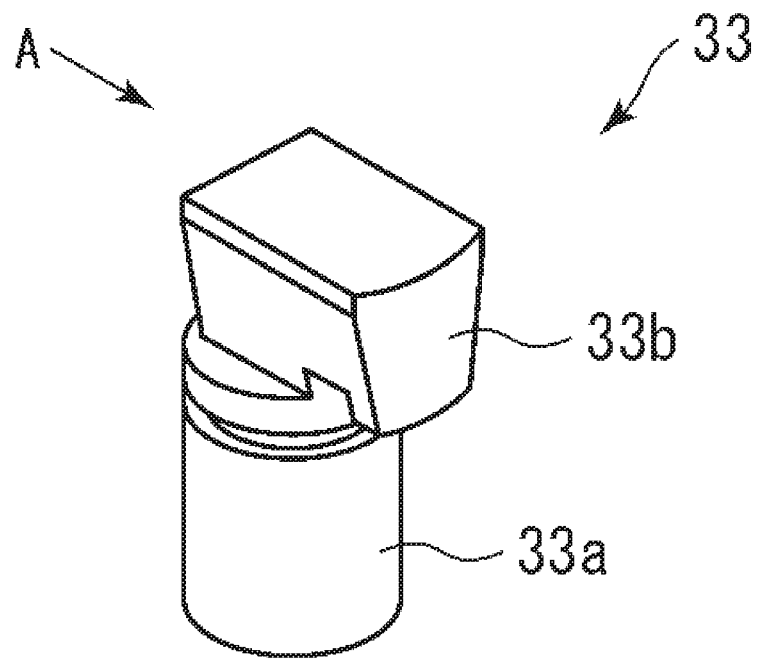
FIG. 6A is a perspective view of a second valve stem on the lower side rotatably supporting the valve member of the butterfly valve shown in FIG. 1.
Figure 6B:
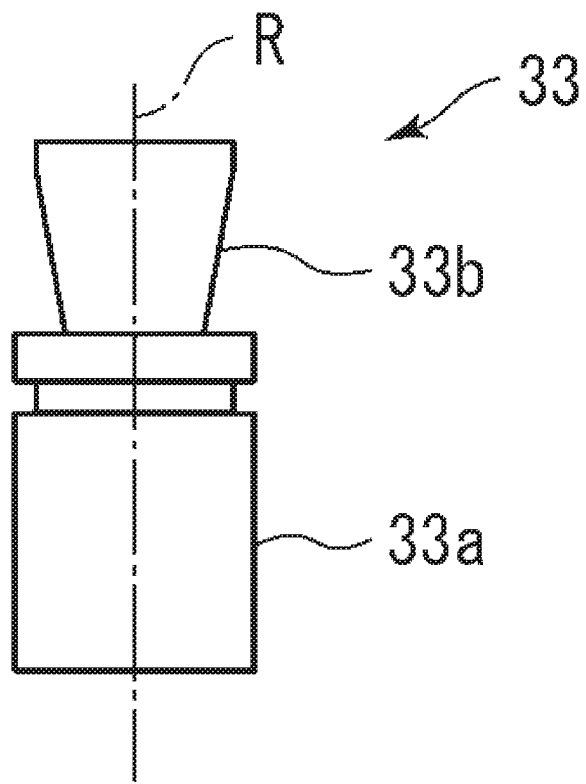
FIG. 6B is a side view of the second valve stem on the lower side rotatably supporting the valve member of the butterfly valve shown in FIG. 1 as viewed from a direction of arrow A.

On the other hand, the second stem hole 41 is a stem bottomed-hole (i.e., non-penetrating stem hole) extending in the direction of the rotation axis R from the internal flow passage 13a of the valve body 13. The second valve stem 33 is inserted into and rotatably supported in the second stem hole 41, so that one end portion thereof projects from the second stem hole 41. The second valve stem 33 includes a stem portion 33a rotatably supported in the second stem hole 41, and an engagement portion 33b which connects to the stem portion 33a and is formed to project from the second stem hole 41. The engagement portion 33b is fitted into the engagement groove 37. In detail, the engagement portion 33b is formed as a rail-like portion extending in a direction perpendicular to the rotation axis R, as shown in FIG. 6A and FIG. 6B, one end of the rail-like portion projects and extends in the direction perpendicular to the rotation axis R from the outer peripheral surface of the stem portion 33a, and the second valve stem 33 has a substantially L shape. The engagement groove 37 of the valve member 15 is formed to have a shape complementary to the rail-like portion as shown in FIG. 4A. The valve member 15 and the second valve stem 33 are coupled to each other to be unrotatable about the rotation axis R by inserting the engagement portion 33b, which is the rail-like portion, into the engagement groove 37 of the valve member 15 in the direction perpendicular to the rotation axis R. The engagement portion 33b, which is the rail-like portion, preferably has a wedge-shaped cross section expanding toward the tip from the root which is a portion connecting to the stem portion 33a. Due to such a wedge shape, the removal of the valve member 15 in the direction of the rotation axis R from the second valve stem 33 can be prevented. However, the cross-sectional shape of the engagement portion 33b is not limited insofar as the valve member 15 and the second valve stem 33 can be unrotatably coupled to each other and may be a polygonal shape, a circular shape, an oval shape, or the like.

Thus, due to the feature that the second stem hole 41 rotatably supporting the second valve stem 33 is formed as a stem bottomed-hole which does not extend through penetrate the valve body 13, a hole penetrating from the internal flow passage 13a to the outside can be eliminated, so that the sealing performance of the internal flow passage 13a can be improved, and thus a possibility that a fluid in the internal flow passage 13a flows out to the outside can be reduced.

As shown in FIG. 1, in order to prevent a fluid in the internal flow passage 13a from entering into the fitting hole 35 or the second stem hole 41 which is a bottomed hole, annular sealing members 43, 45 are disposed in annular grooves provided, on the outer peripheral surfaces of the first valve stem 31 and the stem portion 33a of the second valve stem 33, at positions facing the vicinity of an opening portion into the internal flow passage 13a on the inner peripheral surface of the fitting hole 35 and the vicinity of an opening portion into the internal flow passage 13a on the inner peripheral surface of the second stem hole 41, thereby sealing a space between the inner peripheral surface of the fitting hole 35 and the outer peripheral surface of the first valve stem 31 and a space between the inner peripheral surface of the second stem hole 41 and the outer peripheral surfaces of the stem portion 33a of the second valve stem 33. Further, in order to prevent a fluid in the internal flow passage 13a from flowing out to the outside through the first stem hole 39 which is a stem through-hole, annular sealing members 47a, 47b, 47c formed of a rubber elastic material, such as an O-ring, are disposed in annular grooves provided at a plurality of positions (three places in the embodiment shown in the figures) including a position facing the vicinity of an opening portion of the first stem hole 39 into the internal flow passage 13a on the outer peripheral surface of the first valve stem 31, thereby sealing a space between the inner peripheral surface of the first stem hole 39 and the outer peripheral surface of the first valve stem 31. Furthermore, as shown in detail in FIG. 7, the first valve stem 31 is provided, in the vicinity of an end portion thereof on the side opposite to the fitting portion 31a, with a flange portion 31b, and the valve body 13 is provided, in a portion surrounding an opening portion of the first stem hole 39 to the outside, with an annular recessed portion 13b for receiving therein the flange portion 31b. An annular plane sealing member 47d formed of a rubber elastic material is fitted into an annular groove provided on the surface (hereinafter referred to as a bottom surface) facing the flange portion 31b in the annular recessed portion 13b. The sealing member 47d disposed as described above seals a space between the flange portion 31b and the bottom surface of the annular recessed portion 13b. Thus, even when a fluid in the internal flow passage 13a enters the first stem hole 39, the fluid is prevented from leaking out to the outside from the first stem hole 39. Such a sealing structure is particularly effective when a harmful fluid flows through the internal flow passage 13a. When the fluid leaks out through the space between the inner peripheral surface of the first stem hole 39 and the outer peripheral surface of the first valve stem 31, the plane sealing member 47d is deformed by a fluid pressure, in addition to a pressure deformation between the flange portion 31b and the bottom surface of the annular recessed portion 13b, to be further pressed against the flange portion 31b and the bottom surface of the annular recessed portion 13b. Therefore, the sealability is further improved, so that an effect that the leakage of the fluid can be prevented can be also exhibited.

The butterfly valve 11 of the embodiment shown in the figures is a double eccentric butterfly valve having a double eccentric structure. Referring to FIG. 1 and FIG. 2, in the double eccentric butterfly valve 11, the valve seat portion 17a of the seat ring 17, the valve member valve seat surface 15d, the first valve stem 31, and the second valve stem 33 are provided such that the center, in the direction of the flow passage axis, of the sealing plane defined between the valve member valve seat surface 15d of the valve member 15 and the valve seat portion 17a of the seat ring 17 in valve closing is located eccentrically in the direction of the flow passage axis from the rotation axis R of the valve member 15. Furthermore, as shown in detail in FIG. 2, the first valve stem 31 and the second valve stem 33 are connected to the valve member 15 such that the rotation axis R of the valve member 15 is located away from a center axis O, which extends in parallel to the rotation axis R so as to pass through the center of the cross section of the internal flow passage 13a, by a distance d in the cross section of the internal flow passage 13a. Such a configuration makes it possible to utilize the cam action due to the eccentricity to move the valve member 15 away from the seat ring 17 with a slight angle rotation of the valve member 15 in opening and closing the valve, resulting in a low friction between the seat ring 17 and the valve member 15. Therefore, the wear of the seat ring 17 can be reduced and an operation torque can be decreased.

Moreover, the double eccentric butterfly valve 11 is configured so that the rotation axis R is located eccentrically from the center axis O of the internal flow passage 13a as described above, and therefore the maximum width of the valve member 15 in the direction of the rotation axis R is different between one side and the other side in the radial direction across the rotation axis R. Utilizing this fact, in the double eccentric butterfly valve 11 of the embodiment shown in the figures, the retainer cap 19b is disposed such that the inner peripheral edge end thereof projects into the internal flow passage 13a. Thus, by setting the amount of the projection into the internal flow passage 13a of the retainer cap 19b such that, when the valve member 15 is rotated from a closed valve state into an opened valve state, the valve member 15 can be rotated in one direction about the rotation axis R without making the outer peripheral edge portion 15c interfere with the retainer cap 19b and cannot be rotated in the other direction about the rotation axis R because of the outer peripheral edge portion 15c interfering with the retainer cap 19b, the rotating direction of the valve member 15 from a fully closed state can be restricted.

The valve body 13, the valve member 15, the seat retainer 19, the first valve stem 31, and the second valve stem 33 can be formed of metal materials, resin materials, metal materials coated with resin materials, metal materials formed by insert molding according to an injection molding method, and the like, depending on the intended use.

Next, a method for assembling the butterfly valve 11 will be described with reference to FIG. 8A to FIG. 8E.

Figure 8A:
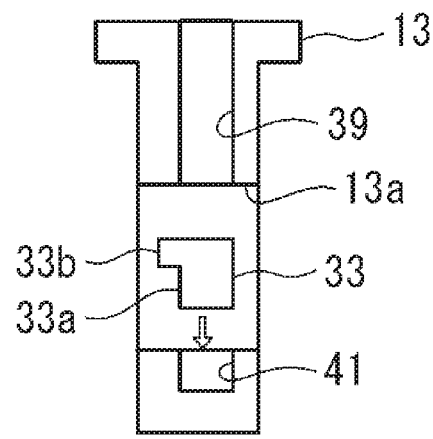
FIG. 8A is an explanatory view illustrating an assembling procedure of a valve body and the valve member of the butterfly valve shown in FIG. 1.

First, as shown in FIG. 8A, the stem portion 33a of the second valve stem 33 is rotatably inserted into the second stem hole 41 of the valve body 13. At this time, the second valve stem 33 is disposed such that the rail-like portion of the engagement portion 33b of the second valve stem 33 extends in the direction of the flow passage axis and the side projecting in the direction perpendicular to the rotation axis R from the peripheral surface of the stem portion 33a is directed to the mounting side (annular recessed portion 21 side) of the seat ring 17.

Figure 8B:
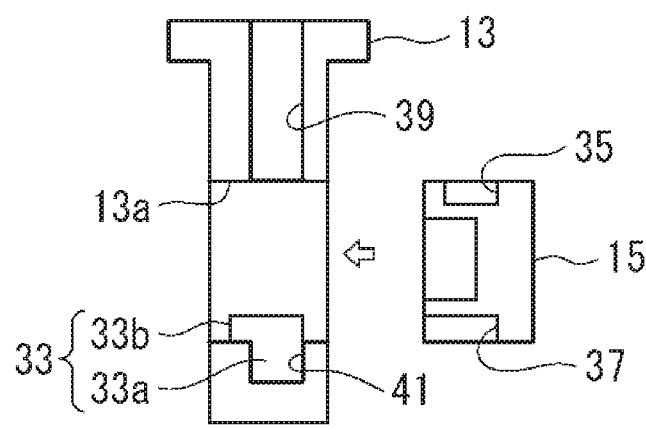
FIG. 8B is an explanatory view illustrating an assembling procedure of the valve body and the valve member of the butterfly valve shown in FIG. 1.
Figure 8C:
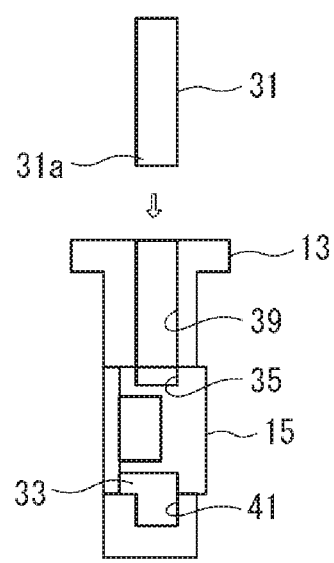
FIG. 8C is an explanatory view illustrating an assembling procedure of the valve body and the valve member of the butterfly valve shown in FIG. 1.

Next, as shown in FIG. 8B, the valve member 15 is inserted into the internal flow passage 13a of the valve body 13 in the direction of the flow passage axis from the side of the valve body 13 opposite to the annular recessed portion 21 in the direction of the flow passage axis, in a state where the engagement groove 37 of the valve member 15 is directed to the valve body 13 side, so that the engagement portion 33b of the second valve stem 33 and the engagement groove 37 of the valve member 15 are fitted into each other and the engagement portion 33b is received in the engagement groove 37 until the engagement portion 33b reaches an end portion of the engagement groove 37. As shown in FIG. 8C, the first valve stem 31 is then inserted into the first stem hole 39, so that the fitting portion 31a of the first valve stem 31 is unrotatably fitted into the fitting hole 35 of the valve member 15. Thus, the valve member 15 is supported in the internal flow passage 13a of the valve body 13 to be rotatable about the rotation axis R.

By inserting the valve member 15 into the internal flow passage 13a in the state where the second valve stem 33 is disposed in the direction described above, the valve member 15 can be inserted from the side close to the second valve stem 33, which facilitates the work.

Figure 8D:
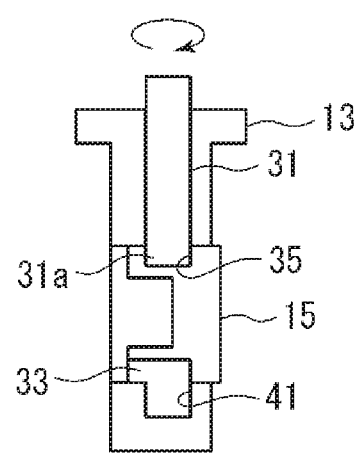
FIG. 8D is an explanatory view illustrating an assembling procedure of the valve body and the valve member of the butterfly valve shown in FIG. 1.
Figure 8E:
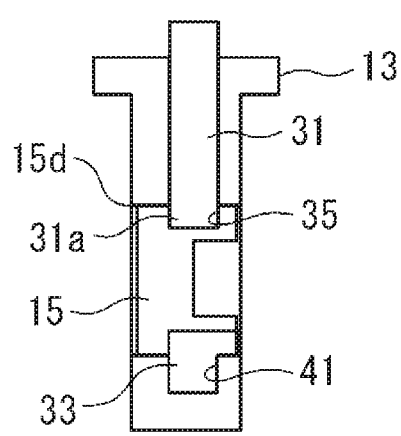
FIG. 8E is an explanatory view illustrating an assembling procedure of the valve body and the valve member of the butterfly valve shown in FIG. 1.

Next, as shown in FIG. 8D, the valve member 15 is rotated by 180° about the rotation axis R in the internal flow passage 13a, and, as shown in FIG. 8E, the valve member valve seat surface 15d of the valve member 15 is disposed to be directed to the side on which the seat ring 17 is mounted, i.e., the annular recessed portion 21 side. Thereafter, the seat ring 17 is attached to the annular recessed portion 21 by the seat retainer 19, so that the assembling of the butterfly valve 11 is completed.

Thus, the butterfly valve 11 is configured so that the valve member 15 is inserted into the internal flow passage 13a in the direction of the flow passage axis in the state where the second valve stem 33 is rotatably supported in the second stem hole 41 which does not penetrate, so that the engagement portion 33b of the second valve stem 33 and the engagement groove 37 of the valve member 15 are fitted into each other and the second valve stem 33 and the valve member 15 are coupled to each other. Hence, the attachment of the valve member 15 to the valve body 13 is facilitated, and thus the method for assembling the butterfly valve can be simplified, so that an assembly cost reduction effect can be obtained. Moreover, the second stem hole 41 is not a stem through-hole, and therefore the leakage of a fluid in the internal flow passage 13a to the outside through the second stem hole 41 is prevented, so that the sealability of the internal flow passage 13a can be improved.

While the butterfly valve 11 according to the present invention has been described above with reference to the embodiment shown in the figures, the present invention is not limited to the embodiment shown in the figures. For example, in the above-described embodiment, the present invention has been described based on the embodiment in which the present invention is applied to the double eccentric butterfly valve 11. However, the application of the present invention is not limited to the double eccentric butterfly valve and the present invention may be applicable to a single eccentric butterfly valve or a multiple eccentric butterfly valve.

DESCRIPTION OF REFERENCE NUMERALS 11 butterfly valve
13 valve body
13a internal flow passage
15 valve member
15c outer peripheral edge portion
15d valve member valve seat surface
17 seat ring
17a valve seat portion
31 first valve stem
31a fitting portion
33 second valve stem
33a stem portion
33b engagement portion
35 fitting hole
37 engagement groove
39 first stem hole
41 second stem hole
47a, 47b, 47c annular sealing member
47d plane sealing member

The invention claimed is:

1. An eccentric butterfly valve comprising a valve body formed therein with an internal flow passage extending in a direction of a flow passage axis, a disk-shaped valve member disposed in the internal flow passage and supported by the valve body through valve stems to be rotatable about a rotation axis perpendicular to the flow passage axis, and a seat ring attached to an inner periphery of the internal flow passage, said seat ring defining a sealing plane sealing the internal flow passage between the seat ring and an outer peripheral edge portion of the valve member in valve closing, said the rotation axis being located eccentrically in the direction of the flow passage axis from the sealing surface, wherein the valve stems include a first valve stem and a second valve stem;

the valve body is formed therein with a stem through-hole and a stem bottomed-hole, said stem through-hole extending through the valve body from an outer peripheral surface of the valve body to the internal flow passage, said first valve stem being rotatably inserted through the stem through-hole, said stem bottomed-hole rotatably supporting the second valve stem;

the valve member is provided at positions thereof opposite to each other in the direction of the rotation axis with a fitting hole and an engagement groove, respectively; and the first valve stem extends through the stem through-hole and is provided at a tip portion thereof with a fitting portion, said fitting portion being fitted into the fitting hole, so that the first valve stem is unrotatably coupled to the valve member, and the second valve stem is provided, at a tip portion thereof projecting from the stem bottomed-hole, with an engagement portion, said engagement portion being inserted into the engagement groove in a direction perpendicular to the rotation axis, so that the second valve stem is unrotatably coupled to the valve member.

2. The eccentric butterfly valve according to claim 1, wherein the engagement portion is a rail-like portion connected to a stem portion of the second valve stem located in the stem bottomed-hole and extending in the direction perpendicular to the valve stem rotation axis, and the engagement groove has a shape complementary to the engagement portion.

3. The eccentric butterfly valve according to claim 2, wherein the rail-like portion has a wedge-shaped cross section expanding toward a tip from a portion connecting to the stem portion.

4. The eccentric butterfly valve according to claim 1, wherein the rotation axis is further located eccentrically from a center of the internal flow passage.

5. The eccentric butterfly valve according to claim 2, wherein the rotation axis is further located eccentrically from a center of the internal flow passage.

6. The eccentric butterfly valve according to claim 3, wherein the rotation axis is further located eccentrically from a center of the internal flow passage.

7. The eccentric butterfly valve according to claim 1, wherein an annular sealing member sealing a space between an inner peripheral surface of the stem through-hole and an outer peripheral surface of the first valve stem is disposed adjacent to an opening portion of the stem through-hole into the internal flow passage.

8. The eccentric butterfly valve according to claim 7, wherein the first valve stem is provided at an end portion on an outer side thereof with a flange portion, the stem through-hole has an annular recessed portion formed in an outer peripheral side end portion thereof, and there is an annular plane sealing member held between the annular recessed portion and the flange portion.

* * * * *